May 31, 1960 A. R. HAMILTON 2,938,387
AUTOMATIC CONTROL CIRCUIT
Filed Dec. 10, 1956 4 Sheets-Sheet 1

INVENTOR.
ALLEN R. HAMILTON
BY
Christie, Parker & Hale
ATTORNEYS

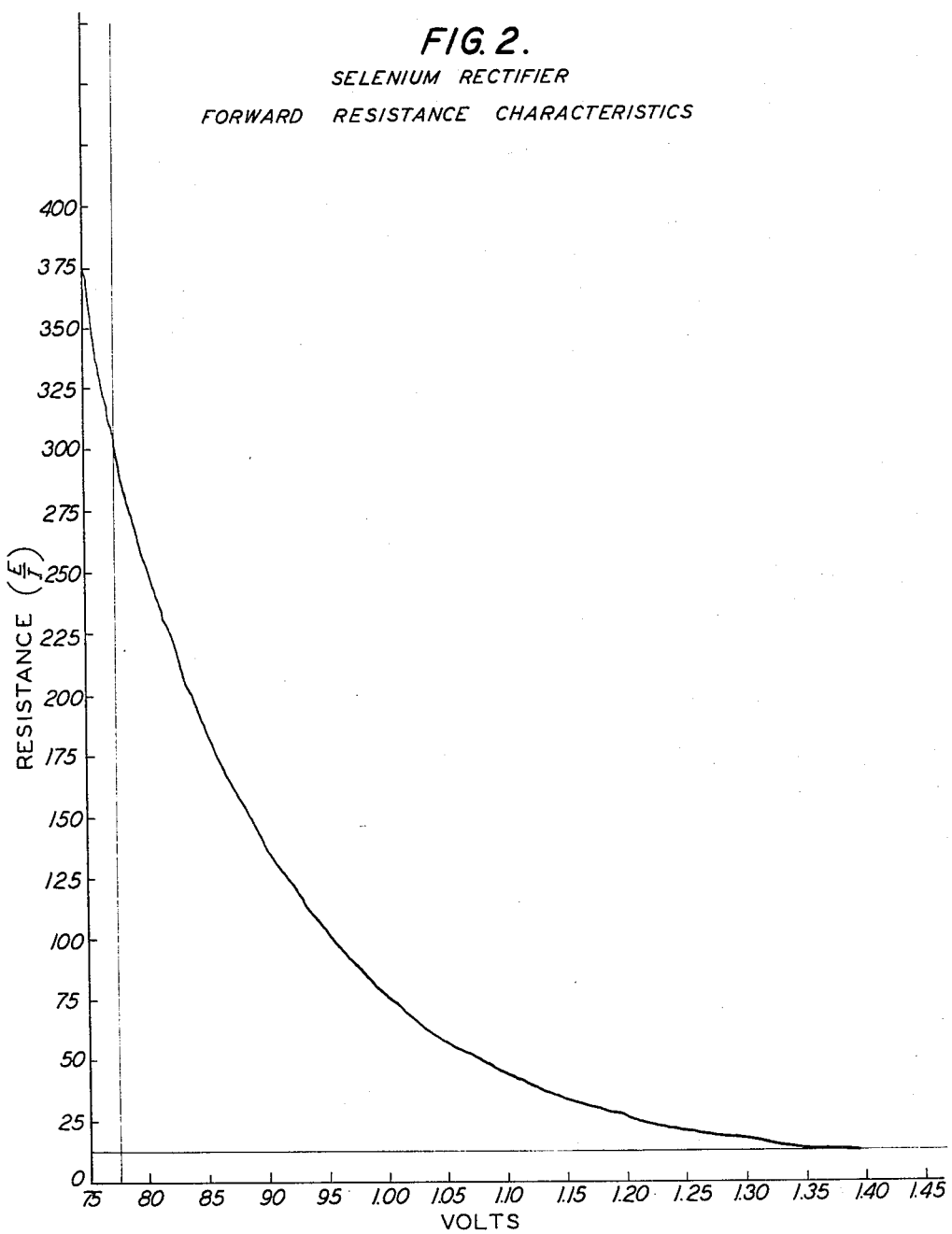

A. R. HAMILTON 2,938,387

AUTOMATIC CONTROL CIRCUIT

Filed Dec. 10, 1956

INVENTOR.
ALLEN R. HAMILTON
BY
Christie, Parker & Hale
ATTORNEYS

United States Patent Office 2,938,387
Patented May 31, 1960

2,938,387

AUTOMATIC CONTROL CIRCUIT

Allen R. Hamilton, Rochester, N.Y., assignor, by mesne assignments, to Consolidated Vacuum Corporation, Rochester, N.Y., a corporation of New York Filed Dec. 10, 1956, Ser. No. 627,454

15 Claims. (Cl. 73—399)

This invention relates to an automatic control circuit for regulating power dissipation in a resistor.

An important application for the circuit of this invention is in Pirani vacuum gauges. Such gauges are well-known and are described in the textbook, "Vacuum Technique," by Dushman, published by John Wiley and Sons, Inc., New York, Second Printing, August 1949, pages 318 through 330.

A Pirani vacuum gauge operates on the principle that the heat conductivity of a gas decreases with the gas pressure. Ordinarily, a sensing element, such as a wire resistor with a high temperature coefficient of resistance, is surrounded by the gas whose pressure is to be measured. The wire resistor is connected in a circuit adapted to supply current to the resistor and heat it above the temperature of the ambient gas. The rate at which the wire loses heat to the gas is a function of the gas pressure and can be measured by any of the following procedures:

(1) The voltage on the wire is maintained constant, and the change in current is observed as a function of the pressure.

(2) The resistance (and consequently the temperature) of the wire is maintained constant, and the energy input required for this is observed as a function of the pressure.

(3) The current is maintained constant, and the change in resistance is observed as a function of the pressure.

One of the disadvantages of present Pirani gauges is their limited range of usefulness. For example, present conventional Pirani gauges are limited to an operating range from about $10^{-5}$ mm. Hg to about 1 mm. Hg. A circuit, which is described in my copending application 602,292, filed August 6, 1956, has been developed to maintain a Pirani gauge sensing resistor at a substantially constant temperature and extend the range of the gauge to about 15 mm. Hg. This invention provides a circuit which permits the operating range of a Pirani gauge to be extended to above atmospheric pressure (760 mm. Hg).

The circuit of this invention is adapted to provide a Pirani gauge in which the resistance, and consequently the temperature, of the sensitive element is maintained constant over one range of pressure, and in which the temperature of the sensitive element is automatically changed over another range of pressure.

According to Ohm's law, the resistance of a resistor is determined by the following equation:

$$R = \frac{E}{I}$$

in which:
R is resistance of the resistor,
E is voltage drop across the resistor, and
I is the current flowing through the resistor.

This invention provides a circuit in which the ratio $$\frac{E}{I}$$

in a resistor is automatically maintained substantially constant to keep the resistance and temperature of the resistor substantially constant over one range of power dissipation in the resistor, and in which the ratio is automatically changed over a different range of power dissipation. The circuit thereby provides a sensitive element for use in a Pirani gauge which will accurately measure gas pressures in the range from about .1 mm. Hg to about 800 mm. Hg, and thus is ideally suited to be combined with the conventional Pirani circuits which are useful in the lower pressure range mentioned above.

Briefly, the invention contemplates an automatic control circuit which includes a sensing resistor adapted to be connected to a source of current. The circuit also includes means responsive to current passing through the resistor and to the voltage drop across the resistor for changing the current through the resistor to maintain the ratio of current through the resistor to voltage across the resistor substantially constant through one range of power dissipation in the resistor. The circuit also includes means responsive to the voltage across the resistor for changing the ratio of current to voltage drop in the resistor through a different range of power dissipation in the resistor.

In the preferred form of the invention, the circuit includes a saturable reactor and means responsive to the current through the resistor for generating a magnetic flux through the reactor in one direction. Also provided are means responsive to the voltage drop across the resistor for generating a magnetic flux through the reactor in an opposite direction. Means are provided which are responsive to the flux in the reactor for controlling the current through the resistor so that the current through the resistor is regulated to maintain the resistor at a substantially constant temperature over one range of power dissipation in the resistor. A voltage sensitive resistor is connected in the circuit to respond to the voltage applied to the sensing resistor for changing the temperature of the sensing resistor through a different range of pressure.

These, and other aspects of the invention will be more fully understood from the following detailed description taken in conjunction with the accompanying drawing, in which:

Fig. 2 is a curve showing the forward resistance characteristics of the voltage sensitive resistor used in the circuit of Fig. 1;

Fig. 4 is a graph showing the operating range of a Pirani gauge using the circuit of Fig. 1;

Figure 1:
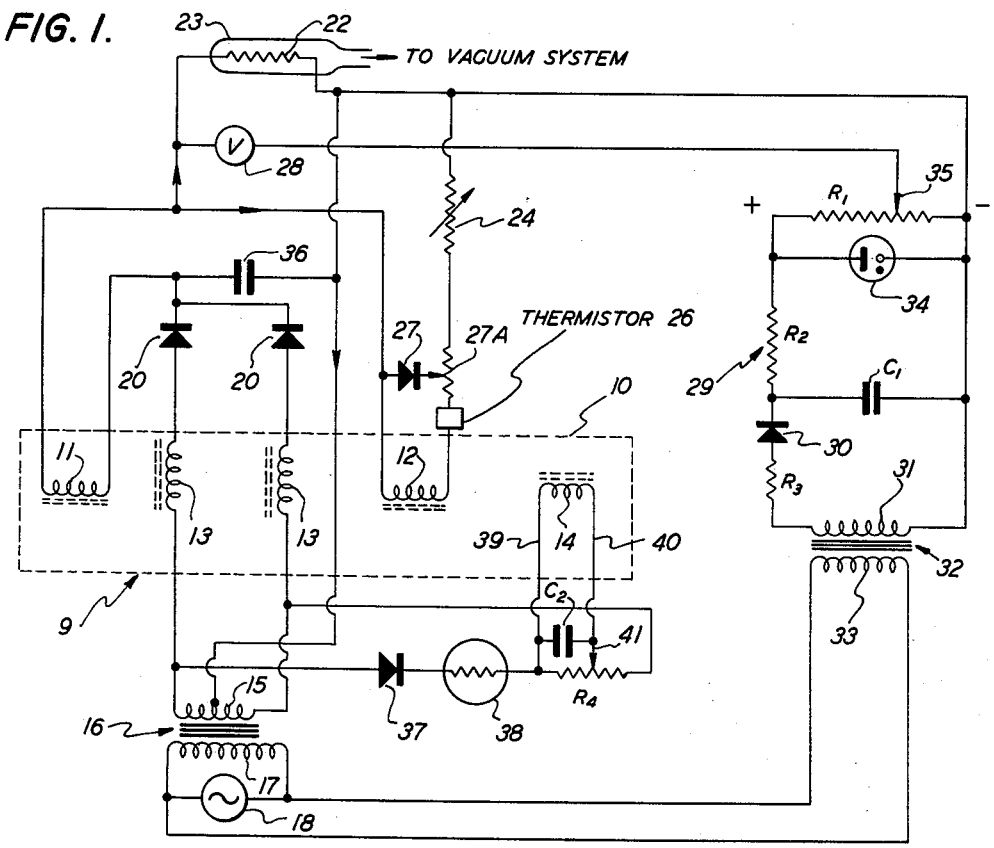
Fig. 1 is a schematic circuit diagram of the presently preferred embodiment of the invention.

Referring to Fig. 1, the circuit includes a magnetic amplifier 9 which has a saturable reactor 10, a current control winding 11, a voltage control winding 12, a pair of load windings 13 and a bias winding 14. The load windings are connected to the opposite ends of a center-tapped secondary winding 15 of a transformer 16 having a primary winding 17, which is supplied power from a suitable alternating current source 18. Each of the load windings feeds into a separate respective semi-conductor type rectifier 20 to supply power to a sensing resistor 22 which is connected in series with the current control winding. The resistor is surrounded by an envelope 23 which is adapted to be connected to a vacuum system (not shown). The voltage control winding is connected across the sensing resistor to be responsive to the voltage drop through the resistor, and a calibrating variable resistor 24 and a thermistor 26 are in series with the voltage control winding. A voltage sensitive resistor 27, having a non-linear negative coefficient, it connected in parallel with the voltage control winding to a potentiometer 27A for adjusting the relative value of the current through the control winding 12 and the non-linear resistor 27. The voltage sensitive resistor may be of any suitable type. I have found that a selenium rectifier having the forward resistance characteristics shown in the curve of Fig. 2 is satisfactory. Such a rectifier is made and sold by International Rectifier Company as rectifier type D–568.

A voltmeter 28 is also connected across the sensing resistor through a bucking voltage supply 29, which includes a potentiometer resistance $R_1$, a pair of limiting resistors $R_2$, $R_3$, and a rectifier 30 connected in series across a secondary coil 31 of a bucking voltage supply transformer 32. A primary coil 33 of the transformer 32 is connected across the A.C. power supply. A smoothing capacitor $C_1$ and a voltage regulator tube 34 are each connected in parallel with the potentiometer resistor. A movable tap 35 of the potentiometer resistor is connected to the voltmeter. The negative end of the bucking voltage supply is connected to the negative end of the sensing resistor. A capacitor 36 is connected in parallel with the current control winding and the sensing resistor to smooth the flow of current through the sensing resistor.

The bias winding is supplied direct current from a D.C. source, which includes a rectifier 37, a current regulator 38 and a resistor $R_4$ connected in series across the secondary winding of the transformer. The bias coil takes its current through a lead 39 connected to one end of the resistor $R_4$, and through another lead 40 connected to a sliding contact 41 adapted to move along the resistor $R_4$. A smoothing capacitor $C_2$ is connected across leads 39 and 40.

For normal operating conditions, the control windings are designed to provide an equal and opposite number of ampere-turns in the saturable reactor, so that when the resistor is at the desired temperature, the flux generated by the control windings is cancelled. The bias winding is wound on the saturable reactor in a direction to aid the flux of the voltage control winding and to oppose the flux of the current control winding.

Figure 3:
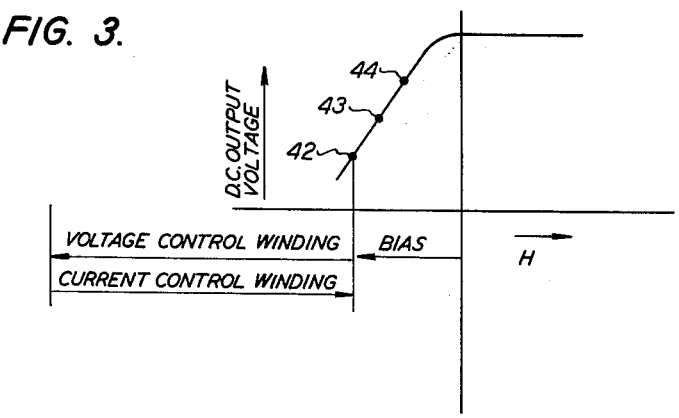
Fig. 3 is a curve showing the operating characteristics of the saturable reactor of Fig. 1.

Fig. 3 shows the output voltage of the magnetic amplifier vs. control M.M.F. applied to the saturable reactor in a conventional plot of D.C. output voltage as the ordinate and magnetizing force (H) as the abscissa. Using the regulated bias supply, the saturable reactor is set to a level of saturation as indicated at a point 42 on the curve of Fig. 3. If desired, the bias winding and its associated supply circuit may be omitted from the circuit of Fig. 1, and instead, the voltage and current control windings may be adjusted so they do not cancel each other, but provide a net flux density in the reactor to give the required bias.

The calibrating variable resistor 24 is set to bring the two control windings into cancellation and maintain the sensing resistor at a suitable temperature, say 142° C., when exposed to a pressure of less than $10^{-5}$ mm. Hg. The bucking voltage to the voltmeter is set so that at "zero" pressure, i.e., less than about $10^{-5}$ mm. Hg., no voltage is indicated by the voltmeter. Thus, the voltmeter will have zero deflection when the sensing resistor is at the desired temperature and the pressure is zero.

As long as the pressure remains at less than $10^{-5}$ mm. Hg., flux generated by the control coils is cancelled, and the output remains at point 42 of Fig. 3. In this condition, the saturable reactor has a relatively high impedance to the flow of current through the load windings to the sensing resistor, and maintains the desired temperature.

As the pressure around the sensing resistor is increased, say to 4 mm. Hg., the temperature of the resistor tends to decrease due to more heat loss from the resistor to the surrounding gas. The resistor may be of any suitable material, but preferably it is of material which has a high thermal coefficient of resistance, such as tungsten, so that as its temperature tends to decrease, its resistance also tends to decrease by a significant amount. This causes current through the current control winding to increase, causing flux in the saturable reactor to increase. At the same time, since the voltage regulation is poor, the voltage across the sensing resistor and the current in the voltage control winding 12 decreases. Since the voltage control winding is opposed to that of the current control winding, it further increases the flux in the saturable reactor, causing the output to move, say, to point 44 on the curve of Fig. 3. Thus, the core is more saturated and offers less impedance to the flow of current through the load windings. The increased load current causes the sensing resistor heat, and also very nearly restores the balance between the control windings so that the resistor is maintained at substantially the original resistance and temperature.

As the pressure around the sensing resistor is decreased, say to about 0.5 mm. Hg., the temperature of the resistor tends to increase due to less heat loss from the resistor to the surrounding gas. This causes current through the current control winding to decrease, causing flux in the saturable reactor to decrease. At the same time, the voltage across the sensing resistor and the current in the voltage control winding increases, causing a further decrease in the flux in the saturable reactor, say to point 43 on the curve of Fig. 3. Thus, the core becomes less saturated and offers more impedance to the flow of current through the load windings. The decreased load current causes the sensing resistor to maintain its original temperature of approximately 142° C.

As the pressure around the resistor is again further increased, say above 10 mm. Hg, the saturation of the reactor is further increased so that a higher voltage is supplied to the sensing resistor to maintain its temperature. In this range of pressure, the voltage across the resistor is sufficiently high that some current begins to flow through the voltage sensitive resistor 27, by-passing a portion of the current which would otherwise flow through the voltage control winding 12. Thus, the current in the voltage control winding does not increase proportionally with the current in the current control winding as was previously the case for the lower pressure range, and the flux in the reactor reaches a higher value than would prevail if the voltage sensitive resistor were not present, permitting the voltage applied to the sensing resistor to increase to a value sufficiently high to heat the sensing resistor substantially above 142° C. Further increases in pressure call for additional increases in voltage applied to the sensing resistor, and result in more by-passing of the voltage control winding in accordance with the forward resistance characteristic of the voltage sensitive resistor shown in the curve of Fig. 2. Thus, as the pressure of the gas around the sensing resistor increases, say to atmospheric pressure, the saturation of the reactor automatically increases to permit the temperature of the sensing resistor to increase also.

The amount of current flowing through the voltage control winding varies over a wide range in the operation of the circuit, and the thermistor, which has a large negative thermal coefficient of resistivity, compensates for the variation in temperature of this control winding.

The operation of the circuit Fig. 1 is enhanced if the design of the magnetic amplifier is such that its gain is large, said 30,000 to 50,000. The performance of the circuit is also improved by making the voltage drop through the current control winding small compared with the voltage drop through the sensing resistor, and by keeping the current drawn by the voltage control winding small compared with the current through the sensing resistor.

The gas pressure surrounding the sensing resistor can be measured in several different ways. For example, it is a function of the voltage across the sensing resistor, the current through the resistor, the power into the sensing resistor and the alternating flux in the saturable reactor, which may be monitored by a meter connected to a suitable winding. An additional advantage of the apparatus shown in Fig. 1 is that the output of the magnetic amplifier circuit is sufficient not only to operate a pressure meter (the voltmeter), but is also sufficient to energize a relay directly. Thus, the circuit may be used to achieve direct control without the usual complication of super-sensitive relays, interrupter circuits, amplifiers, etc.

Figure 4:
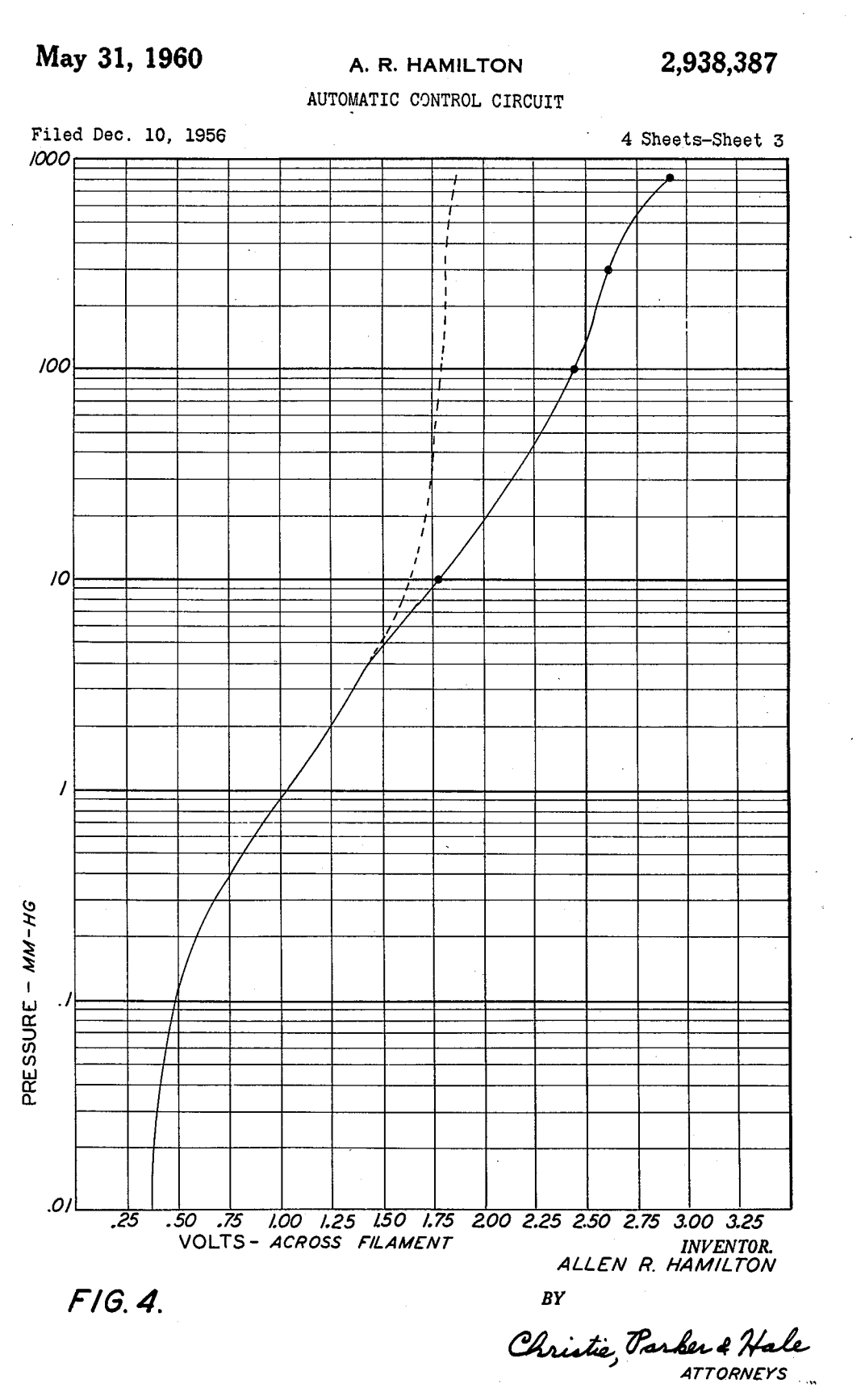

In the presently preferred form of the invention, the gas pressure is measured by means of the voltmeter 28 connected across the sensing resistor. In Fig. 4 the solid curve is a plot of the voltage across the sensing resistor against the pressure of air surrounding the sensing resistor, using the circuit of Fig. 1. The dotted curve of Fig. 4 is a similar plot of data obtained with the same circuit except that the voltage sensitive resistor was removed so that the temperature of the sensing resistor was kept constant throughout the pressure range investigated.

Both curves of Fig. 4 were obtained using a tungsten filament as a sensing resistor. Prior to use in the circuit, the filament had its surface blackened by heating to a red heat in air. The filament was held in a horizontal position during the measurement and had a resistance of 8.75 ohms at 27° C.

As can be seen from the curves of Fig. 4, using the voltage sensitive regulator, the change in voltage with change in pressure is sufficiently high in the region from about .1 mm. Hg to about 800 mm. Hg to provide an accurate measurement of pressure. On the other hand, keeping the sensing resistor at a constant temperature for the entire pressure range of higher pressures produced a curve which becomes increasingly steep above about 10 mm. Hg so that it is of little quantitative use above about 15 mm. Hg. Below about .1 mm. Hg, either with or without the voltage sensitive resistor, the curve is so steep that it is preferable to switch the resistor to a conventional constant voltage bridge circuit for measuring pressures below this value, using the magnetic amplifier as a voltage regulator power supply for the bridge.

Figure 5:
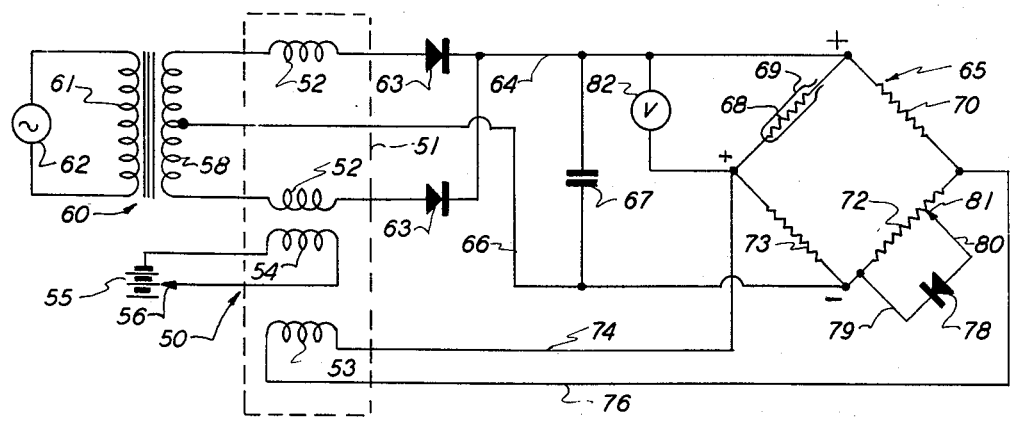
Fig. 5 is a schematic circuit diagram of an alternate embodiment of the invention.

Fig. 5 is a schematic circuit diagram of an alternate embodiment of the invention which includes a magnetic amplifier 50 having a saturable reactor 51, a pair of load windings 52, a control winding 53 and a bias winding 54 which is supplied current from a D.C. source 55 through an adjustable tap 56. The load windings are connected to the opposite ends of a center-tapped secondary winding 58 of a transformer 60 having a primary winding 61, which is supplied power from a suitable alternating current source 62. Each of the load windings feeds into a separate semi-conductor type rectifier 63. A positive lead 64 connects the rectifiers to one input of a four-arm Wheatstone bridge 65. A negative lead 66 connects the center-tap point of the transformer secondary winding to the other input of the bridge. A smoothing capacitor 67 is connected across the positive and negative leads. A Pirani gauge sensing resistor 68 forms a first arm of the bridge and is surrounded by an envelope 69 adapted to be connected to a vacuum system (not shown).

A second bridge resistor 70 and a third bridge resistor 72 are connected in series across leads 64 and 66 to form the second and third arms, respectively, of the bridge. A fourth bridge resistor 73 is connected in series with the sensing resistor across the leads 64, 66 to form the fourth arm of the bridge. One end of the magnetic amplifier control winding is connected by a lead 74 to the bridge output between the sensing resistor and the fourth bridge resistor, and the other end of the control winding is connected by a lead 76 to the other bridge output between the second and third bridge resistors. A non-linear voltage sensitive resistor 78 is connected by a lead 79 to the negative supply lead, and is connected by a lead 80 to a movable tap 81 adapted to slide along the third bridge resistor 72. A voltmeter 82 is connected across the sensing resistor. If desired, the voltmeter may be supplied a bucking voltage in a manner similar to that shown in the circuit of Fig. 1, so that the voltmeter deflection may be set to be zero when the pressure is zero.

In the operation of the circuit of Fig. 5, the resistances of the bridge arms are such that when the Pirani gauge envelope is evacuated to a "hard" vacuum, say less than $10^{-5}$ mm. Hg, the bridge is in balance, i.e., no current flows through the control winding, and the reactor is at a level of saturation as indicated at point 42 of the curve of Fig. 3, this degree of saturation being adjusted by the bias winding.

As the pressure around the sensing resistor is increased, its temperature decreases, causing a bridge unbalance and current flow through the magnetic amplifier control winding. The current flows through the control winding in such a direction as to increase the bridge voltage (increase the saturation of the reactor) and hence the temperature of the Pirani sensing resistor to restore the bridge balance. Thus, the circuit will tend to maintain the sensing resistor at a constant temperature as long as the voltage across the third arm of the bridge containing the parallel combination of linear and non-linear resistors is low enough to prevent any appreciable current flow through the non-linear resistor. However, when the pressure around the sensing resistor rises sufficiently, say to about 10 mm. Hg, the voltage across the non-linear resistor is sufficiently high so that current begins to flow through it and thus decrease the effective resistance of the third arm of the bridge. As the resistance of the non-linear arm decreases, the arm containing the Pirani sensing resistor must increase to restore balance. Thus, the circuit requires higher and higher temperatures for the sensing resistor to maintain bridge balance.

A calibration curve similar to the solid curve of Fig. 4 is obtained by adjusting the circuit constants so that the Pirani tube operates at a constant temperature from 1 micron to approximately 10 mm. Hg. Above 10 mm. Hg, the effect of the non-linear resistor becomes significant, and the Pirani sensing resistor temperature increases with pressure.

The movable tap 80 adapted to slide along the third bridge resistor 72 provides a means of adjusting the relationship between the linear and non-linear resistance arms to permit adjustment of the pressure at which the sensing resistor temperature begins to increase, as well as permit adjustment of the rate of increase of temperature with pressure.

The non-linear resistor is not restricted to the type having a negative temperature co-efficient of resistance. A non-linear resistor with a positive temperature co-efficient of resistance may also be used by connecting it in parallel with a proper bridge arm, either second arm 70 or fourth arm 73 of Fig. 5.

Figure 6:
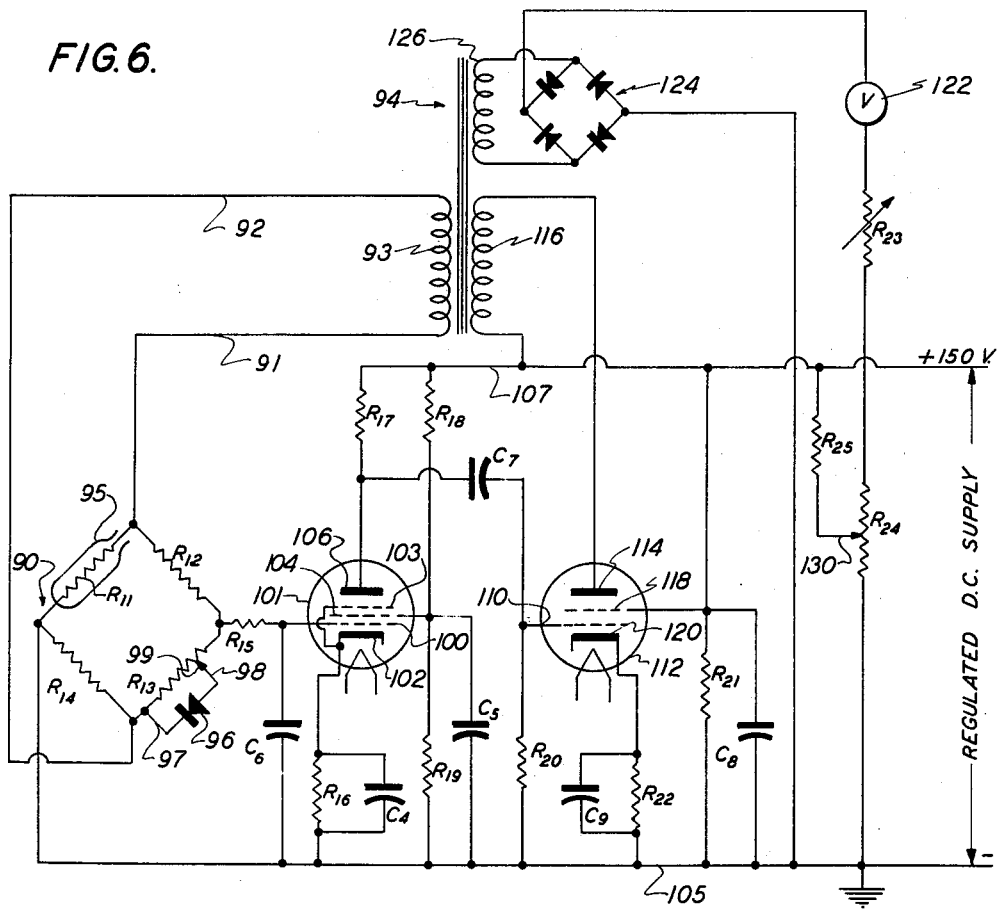
Fig. 6 is a schematic circuit diagram of another form of the invention.

Fig. 6 is a schematic circuit diagram of another embodiment of the invention which includes at Wheatstone bridge 90 having its input connected by leads 91 and 92 to a secondary winding 93 of a transformer 94. A Pirani gauge sensing resistor $R_{11}$ forms a first arm of the bridge and is surrounded by an envelope 95 adapted to be connected to a vacuum system (not shown).

Second and third bridge resistors $R_{12}$ and $R_{13}$, respectively, are connected in series with leads 91 and 92 to form the second and third arms, respectively, of the bridge. A non-linear voltage sensitive resistor 96 is connected by a lead 97 to the bridge input between resistors $R_{13}$ and $R_{14}$, and is connected by a lead 98 to a movable tap 99 adapted to slide along the third bridge resistor $R_{13}$.

A fourth bridge resistor $R_{14}$ is connected in series with the sensing resistor to form the fourth arm of the bridge. A control grid 100 of an amplifier tube 101 is connected through a resistor $R_{15}$ to the bridge output between the resistors $R_{12}$ and $R_{13}$. A cathode 102 of the amplifier tube is connected through a cathode biasing resistor $R_{16}$ to the other output of the bridge between the sensing resistor and resistor $R_{14}$. A capacitor $C_4$ is connected across the biasing resistor $R_{16}$ to bypass A.C. current.

A suppressor grid 103 of the amplifier tube is connected to the cathode, and a screen grid 104 is connected through a capacitor $C_5$ to a negative D.C. lead 105 which is connected to the negative terminal of a D.C. power source (not shown), and which is grounded. A plate 106 of the amplifier tube is connected through a plate resistor $R_{17}$ to a positive D.C. lead 107 which is connected to the positive terminal of the D.C. power source. A capacitor $C_6$ is connected to the negative terminal and to a point between resistor $R_{15}$ and the amplifier tube control grid to aid in causing the circuit to oscillate. Resistors $R_{18}$ and $R_{19}$ are connected in series across the negative and positive D.C. leads to provide the correct voltage for the screen grid which is connected to a point between these two resistors. The plate output of the amplifier tube is connected through a capacitor $C_7$ to a control grid 110 of a power output tube 112. The control grid of the power output tube is connected through a resistor $R_{20}$ to the negative D.C. lead to provide a return path to ground for the grid, and thus prevent this grid from being blocked by the accumulation of negative charges.

A plate 114 of the power output tube is connected through a primary coil 116 of the transformer 94 to the positive D.C. lead. A control screen 118 of the power output tube is connected through a resistor $R_{21}$ to the negative D.C. lead. An A.C. bypass resistor $C_8$ is connected across resistor $R_{21}$. A cathode 120 of the power output tube is connected through a cathode biasing resistor $R_{22}$ to the negative D.C. lead. An A.C. bypass capacitor $C_9$ is connected across resistor $R_{22}$.

One side of a voltmeter 122 is connected to one output of a four-arm rectifier bridge 124 which has two inputs connected across a sensing winding 126 on the transformer 94. The other output of the rectifying bridge is connected to the negative D.C. lead.

The other side of the voltmeter is connected through a variable resistor $R_{23}$ and a potentiometer resistor $R_{24}$ to the negative D.C. lead. A movable tap 130 is adapted to slide along the potentiometer resistor $R_{24}$ and is connected through a limiting resistor $R_{25}$ to the positive D.C. lead. By proper adjustment of the movable tap 130, a voltage can be applied to the voltmeter so that there is zero deflection when the sensing resistor is at the proper temperature and the gas pressure surrounding it is "zero," i.e., less than about $10^{-5}$ mm. Hg.

In the operation of the circuit of Fig. 6, the circuit constants are such that the amplifier circuit functions as an oscillator, providing alternating current to the bridge circuit. Starting with the gas pressure in the Pirani gauge envelope at "zero" and with the sensing resistor at the desired temperature, say 142° C., the bridge is in balance and the power supplied from the power output tube to the secondary winding 93 is sufficient to maintain the input voltage at the proper value to keep the sensing resistor at the desired temperature. The movable tap of the potentiometer is set to "buck out" the voltage applied to voltmeter 122 from the sensing coil, so that there is zero deflection of the meter. As the pressure in the envelope increases, say to about .5 mm. Hg, the temperature of the sensing resistor tends to decrease, causing an unbalance of the bridge 90, which in turn impresses a signal across the control grid and cathode of the amplifier tube. The signal is amplified and impressed across the grid and cathode of the power tube, which increases the power output of the tube, thus sending more power through the primary winding of the transformer. This steps up the voltage applied to the grid until the temperature of the sensing resistor is very nearly restored to its original value, thus bringing the bridge into balance. If the pressure then decreases, the temperature of the sensing resistor tends to increase, which produces an unbalance signal in the bridge which reduces the power output of the power output tube to keep the sensing resistor at the desired temperature.

As the pressure around the sensing resistor increases farther, say to about 15 mm. Hg, the voltage applied to the bridge is sufficiently high that a significant amount of current begins to flow through the non-linear voltage sensitive resistor 96 connected across the third resistor in the bridge, thus causing the power output tube to supply more voltage to the bridge than it would otherwise. This causes the temperature of the sensing resistor to be maintained at higher values to restore bridge balance.

The sensing coil 126 monitors the amount of power fed into the bridge, and the variable resistor $R_{23}$ is a sensitivity control by which the voltmeter can be adjusted to read directly in pressure units.

As with the circuits shown in Figs. 1 and 5, the automatic increase of temperature (power dissipation) of the sensing resistor results in a vacuum gauge circuit having a calibration curve similar to that shown in Fig. 4.

I claim:

1. An automatic control circuit comprising a temperature-sensitive resistor adapted to be connected to a source of current for the dissipation of power, means responsive to the current passing through the resistor and to the voltage drop across the resistor for changing the current through the resistor to maintain the temperature thereof substantially constant and therefore the ratio of current through the resistor to voltage across the resistor substantially constant through one range of power dissipation, and means responsive to the voltage across the resistor for changing the temperature of the resistor and therefore the said ratio through a different range of power dissipation.

2. A circuit according to claim 1 which includes a voltmeter for measuring the voltage across the resistor, and means for bucking out at least a portion of the voltage across the resistor.

3. An automatic control circuit comprising a temperature-sensitive resistor adapted to be connected to a source of current for the dissipation of power, means responsive to the current passing through the resistor and to the voltage drop across the resistor for changing the current through the resistor to maintain the temperature thereof substantially constant and therefore the ratio of current through the resistor to voltage across the resistor substantially constant through one range of power dissipation, and means responsive to the voltage across the resistor for increasing the temperature of the resistor and therefore the said ratio through a higher range of power dissipation.

4. An automatic control circuit comprising a temperature-sensitive resistor adapted to be connected to a source of current for the dissipation of power, means responsive to the current passing through the temperature-sensitive resistor and to the voltage drop across the temperature-sensitive resistor for changing the current through the temperature-sensitive resistor to maintain the temperature thereof substantially constant and therefore the ratio of current through the temperature-sensitive resistor to voltage across the temperature-sensitive resistor substantially constant through one range of power dissipation, and a voltage-sensitive resistor connected to be responsive to the voltage across the temperature-sensitive resistor for changing the temperature of said temperature-sensitive resistor and therefore the said ratio through a different range of power dissipation.

5. A circuit according to claim 4 in which the voltage-sensitive resistor has a non-linear negative coefficient of resistance and is connected in parallel with the temperature-sensitive resistor.

6. An automatic control circuit comprising a temperature-sensitive resistor adapted to be connected to a source of current for the dissipation of power, a saturable reactor, means responsive to the current passing through the temperature-sensitive resistor for generating a magnetic flux through the reactor in one direction, means responsive to the voltage drop across the resistor for generating a magnetic flux through the reactor in the opposite direction, means responsive to the flux in the reactor for controlling the current through the temperature-sensitive resistor through one range of power dissipation to maintain the temperature thereof substantially constant and therefore the ratio of current through the resistor to voltage across the resistor substantially constant, and means responsive to the voltage across the resistor for changing the temperature of the resistor and therefore the said ratio through a different range of power dissipation.

7. An automatic control circuit comprising a temperature-sensitive resistor adapted to be connected to a source of current for the dissipation of power, a saturable reactor, means responsive to the current passing through the temperature-sensitive resistor for generating a magnetic flux through the reactor in one direction, means responsive to the voltage drop across the temperature-sensitive resistor for generating a magnetic flux through the reactor in the opposite direction, means responsive to the flux in the reactor for controlling the current through the temperature-sensitive resistor through one range of power dissipation to maintain the temperature of the temperature-sensitive resistor substantially constant and therefore the ratio of current through the temperature-sensitive resistor to voltage across the temperature-sensitive resistor substantially constant, and a voltage-sensitive resistor responsive to the voltage across the temperature-sensitive resistor for changing the temperature of the temperature-sensitive resistor and therefore the said ratio through a different range of power dissipation.

8. An automatic control circuit comprising a temperature-sensitive resistor adapted to be connected to a source of current for the dissipation of power, a saturable reactor, means responsive to the current passing through the temperature-sensitive resistor for generating a magnetic flux through the reactor in one direction, means responsive to the voltage drop across the temperature-sensitive resistor for generating a magnetic flux through the reactor in the opposite direction, means responsive to the flux in the reactor for controlling the current through the temperature-sensitive resistor through one range of power dissipation to maintain the temperature of the temperature-sensitive resistor substantially constant and therefore the ratio of current through the temperature-sensitive resistor to voltage across the temperature sensitive resistor substantially constant, and a voltage-sensitive resistor connected in parallel with the temperature-sensitive resistor to be responsive to the voltage across the temperature-sensitive resistor and change the temperature of the temperature-sensitive resistor and therefore the said ratio through a different range of power dissipation.

9. An automatic control circuit comprising a four-arm Wheatstone bridge having an input and an output, a sensing resistor having a high thermal coefficient of resistance forming one arm of the bridge, a magnetic amplifier having its output connected to the bridge input, a saturable reactor in the magnetic amplifier, means responsive to the flux in the reactor for controlling the amplifier output, means responsive to the bridge output for generating a magnetic flux in the reactor to keep the sensing resistor at a substantially constant temperature through one range of power dissipation by the sensing resistor, and means responsive to the voltage across the bridge input for changing the temperature of the sensing resistor through a different range of power dissipation.

10. An automatic control circuit comprising a four-arm Wheatstone bridge having an input and an output, a sensing resistor having a high thermal coefficient of resistance forming one arm of the bridge, a magnetic amplifier having its output connected to the bridge input, a saturable reactor in the magnetic amplifier, means responsive to the flux in the reactor for controlling the amplifier output, means responsive to the bridge output for generating a magnetic flux in the reactor to keep the sensing resistor at a substantially constant temperature through one range of power dissipation by the sensing resistor, and means for altering the effective resistance of one of the other arms of the bridge in response to the voltage across the bridge for changing the temperature of the sensing resistor through a different range of power dissipation.

11. An automatic control circuit comprising a four-arm Wheatstone bridge having an input and an output, a sensing resistor having a high thermal coefficient of resistance forming one arm of the bridge, a magnetic amplifier having its output connected to the bridge input, a saturable reactor in the magnetic amplifier, means responsive to the flux in the reactor for controlling the amplifier output, means responsive to the bridge output for generating a magnetic flux in the reactor to keep the sensing resistor at a substantially constant temperature through one range of power dissipation by the sensing resistor, and a negative coefficient voltage-sensitive resistor in parallel with the resistance in the arm of the bridge opposite from the sensing resistor for altering the effective resistance of said opposite arm of the bridge in response to the voltage across the bridge for changing the temperature of the sensing resistor through a different range of power dissipation.

12. An automatic control circuit comprising a four-arm Wheatstone bridge having an input and an output, a sensing resistor having a high thermal coefficient of resistance forming one arm of the bridge, a source of power for the bridge, means for regulating the source of power in response to the bridge output to keep the sensing resistor at a substantially constant temperature through one range of power dissipation by the sensing resistor, and means responsive to the voltage applied to the bridge input for regulating the source of power to change the temperature of the sensing resistor through a different range of power dissipation.

13. An automatic control circuit comprising a four-arm Wheatstone bridge having an input and an output a sensing resistor having a high thermal coefficient of resistance forming one arm of the bridge, an electronic amplifying device having an input and an output, the bridge output being connected to the input of the amplifying device, an electronic power output device having an input and an output, the output of the amplifying device being coupled to the input of the power device, and the output of the power device being coupled to the bridge input, and means for altering the effective resistance of one of the other arms of the bridge in response to the voltage applied to the bridge.

14. A Pirani vacuum gauge circuit including a sensing resistor having a high thermal coefficient of resistance adapted to be connected to a source of power, means responsive to the current passing through the resistor and to the voltage drop across the resistor for automatically maintaining the temperature of the sensing resistor substantially constant when the resistor is exposed to one range of gas pressures and for automatically increasing the temperature of the resistor as it is exposed to higher gas pressures, and means responsive to the voltage drop across the resistor for establishing a signal representative of the pressure of the gas to which the resistor is exposed.

15. A Pirani vacuum gauge circuit including a sensing resistor having a high thermal coefficient of resistance adapted to be connected to a source of power, means responsive to the current passing through the resistor and to the voltage drop across the resistor for automatically maintaining the temperature of the sensing resistor substantially constant when the resistor is exposed to one range of gas pressures and for automatically increasing the temperature of the resistor as it is exposed to higher gas pressures, and means responsive to the current passing through the resistor for establishing a signal representative of the pressure of the gas to which the resistor is exposed.

References Cited in the file of this patent

UNITED STATES PATENTS

| | | |
|---|---|---|
| 2,386,903 | Lutomirski | Oct. 16, 1945 |
| 2,503,880 | Mah | Apr. 11, 1950 |
| 2,549,782 | Engelman | Apr. 24, 1951 |
| 2,706,911 | Strong | Apr. 26, 1955 |